United States Patent
Richter

(10) Patent No.: US 8,776,921 B2
(45) Date of Patent: Jul. 15, 2014

(54) METHOD AND DEVICE FOR STARTING THE MOVEMENT OF A HYBRID VEHICLE

(75) Inventor: Boyke Richter, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 594 days.

(21) Appl. No.: 13/055,377

(22) PCT Filed: Jun. 17, 2009

(86) PCT No.: PCT/EP2009/057518
§ 371 (c)(1),
(2), (4) Date: Apr. 13, 2011

(87) PCT Pub. No.: WO2010/009943
PCT Pub. Date: Jan. 28, 2010

(65) Prior Publication Data
US 2011/0186369 A1  Aug. 4, 2011

(30) Foreign Application Priority Data
Jul. 24, 2008 (DE) .......................... 10 2008 040 692

(51) Int. Cl.
*B60W 20/00* (2006.01)
(52) U.S. Cl.
USPC .................................. 180/65.285; 180/65.26
(58) Field of Classification Search
CPC ........................................................ B60K 6/36
USPC ........ 180/65.265, 65.275, 65.6, 65.25, 65.26; 903/930; 477/5, 115
See application file for complete search history.

(56) References Cited

U.S. PATENT DOCUMENTS

| | | | |
|---|---|---|---|
| 5,407,401 A * | 4/1995 | Bullmer et al. | 477/110 |
| 5,603,672 A * | 2/1997 | Zhang | 477/110 |
| 6,634,247 B2 * | 10/2003 | Pels et al. | 74/329 |
| 6,712,734 B1 * | 3/2004 | Loeffler | 477/5 |
| 6,722,457 B2 * | 4/2004 | Yamaguchi et al. | 180/65.235 |
| 6,941,830 B2 * | 9/2005 | Ibamoto et al. | 74/339 |
| 7,093,512 B2 * | 8/2006 | Ibamoto et al. | 74/339 |

(Continued)

FOREIGN PATENT DOCUMENTS

| DE | 10260435 | 7/2004 |
|---|---|---|
| DE | 102004045542 | 4/2006 |

(Continued)

OTHER PUBLICATIONS

International Search Report, PCT International Patent Application No. PCT/EP2009/057518, dated Dec. 1, 2009.

(Continued)

*Primary Examiner* — Katy M Ebner
*Assistant Examiner* — Brodie Follman
(74) *Attorney, Agent, or Firm* — Kenyon & Kenyon LLP

(57) ABSTRACT

The invention relates to a method for starting the movement of a hybrid vehicle, which has a first (1) and a second drive unit (2), the first drive unit (1) being disposed on a first sub-transmission (T2) of a twin-clutch transmission having two sub-transmissions (T1, S1; T2, S2), In order to avoid rolling backwards when starting to move the hybrid vehicle in an attempt to start the movement using the first drive unit (1), the second drive unit (2) is started when starting the movement of the hybrid vehicle using the first drive unit (1), without interrupting the stress applied on the drive train (3) comprising the twin-clutch transmission.

10 Claims, 3 Drawing Sheets

(56) References Cited

U.S. PATENT DOCUMENTS

| | | | |
|---|---|---|---|
| 7,094,176 B2* | 8/2006 | Budal et al. | 477/5 |
| 7,464,616 B2* | 12/2008 | Leibbrandt et al. | 74/331 |
| 7,476,176 B2* | 1/2009 | Ibamoto et al. | 477/15 |
| 7,625,311 B2* | 12/2009 | Dilzer | 477/5 |
| 7,670,256 B2* | 3/2010 | Winkelmann et al. | 477/5 |
| 7,770,676 B2* | 8/2010 | Tenbrock et al. | 180/65.285 |
| 7,840,329 B2* | 11/2010 | Katakura et al. | 701/61 |
| 8,050,830 B2* | 11/2011 | Komeda et al. | 701/51 |
| 8,170,760 B2* | 5/2012 | Sato et al. | 701/54 |
| 8,177,685 B2* | 5/2012 | Leibbrandt et al. | 477/109 |
| 8,251,865 B2* | 8/2012 | Kaltenbach et al. | 477/5 |
| 8,262,524 B2* | 9/2012 | Rask et al. | 475/5 |
| 8,360,183 B2* | 1/2013 | Sauvlet et al. | 180/65.28 |
| 2002/0033059 A1* | 3/2002 | Pels et al. | 74/329 |
| 2002/0177504 A1 | 11/2002 | Pels et al. | |
| 2003/0054920 A1* | 3/2003 | Berger et al. | 477/70 |
| 2005/0064987 A1* | 3/2005 | Budal et al. | 477/3 |
| 2005/0072256 A1* | 4/2005 | Ibamoto et al. | 74/339 |
| 2005/0101432 A1* | 5/2005 | Pels et al. | 477/5 |
| 2006/0169505 A1* | 8/2006 | Adamis et al. | 180/65.2 |
| 2006/0258506 A1* | 11/2006 | Ibamoto et al. | 477/5 |
| 2007/0028718 A1 | 2/2007 | Lee et al. | |
| 2007/0157899 A1* | 7/2007 | Seufert et al. | 123/179.25 |
| 2007/0246273 A1* | 10/2007 | Tenbrock et al. | 180/65.2 |
| 2008/0000312 A1* | 1/2008 | Lang et al. | 74/340 |
| 2008/0227592 A1 | 9/2008 | Steffen et al. | |
| 2009/0054201 A1* | 2/2009 | Winkelmann et al. | 477/5 |
| 2009/0176617 A1* | 7/2009 | Dilzer | 477/5 |
| 2010/0009805 A1* | 1/2010 | Bachmann | 477/5 |
| 2010/0025131 A1* | 2/2010 | Gloceri et al. | 180/65.28 |
| 2010/0204005 A1* | 8/2010 | Kaltenbach | 477/5 |
| 2010/0210410 A1* | 8/2010 | Kaltenbach et al. | 477/3 |
| 2010/0263952 A1* | 10/2010 | Richter et al. | 180/65.275 |
| 2011/0017015 A1* | 1/2011 | Cimatti et al. | 74/665 R |
| 2011/0054745 A1* | 3/2011 | Sato et al. | 701/54 |
| 2011/0174558 A1* | 7/2011 | Tanba et al. | 180/65.22 |
| 2011/0179905 A1* | 7/2011 | Tanba et al. | 74/661 |
| 2011/0185847 A1* | 8/2011 | Tanba et al. | 74/661 |
| 2011/0288703 A1* | 11/2011 | Falkenstein et al. | 701/22 |
| 2012/0129649 A1* | 5/2012 | Kaltenbach | 477/5 |

FOREIGN PATENT DOCUMENTS

| | | |
|---|---|---|
| DE | 102007050659 | 4/2009 |
| JP | 2005-147312 | 6/2005 |
| JP | 2006-163946 | 6/2006 |
| WO | WO 2007/042109 | 4/2007 |

OTHER PUBLICATIONS

Berger R. et al., "ESG-Elektrisches Schaltgetrieb" ATZ Automobiltische Zeitschrift, Vieweg Publishing, Wiesbaden, DE, Bd. 107, Nr. 6, 1, Jun. 2005, pp. 488-493, XP001519133.

* cited by examiner

METHOD AND DEVICE FOR STARTING THE MOVEMENT OF A HYBRID VEHICLE

BACKGROUND OF THE INVENTION

The present invention relates to a method for starting the movement of a hybrid vehicle, which has a first and a second drive unit, the first drive unit being disposed on a first sub-transmission of a twin-clutch transmission comprising two sub-transmissions, and to a device for implementing the method.

Vehicles having a hybrid drive structure have a combustion engine and a second drive unit, which may be an electric motor for example. Thus, when driving the hybrid vehicle, the drive torque may be applied by both drive units.

US 2007/0028718 A1 describes a twin-clutch transmission for a hybrid vehicle, the twin-clutch transmission having two transmission input shafts, on which respectively some of the transmission gears are disposed. If a gear is engaged, the following gear may already be shifted on the inactive shaft. By shifting between the two shafts with the aid of two clutches it is thus possible to shift gears quickly. In a torque-split hybrid vehicle, the electric motor is connected to one of the two transmission input shafts of the twin-clutch transmission.

When starting the movement using the electric motor, the drive torque is insufficient, particularly for a fully loaded vehicle on a hill or on a curb, even though a gear is engaged in this sub-transmission and the drive train is stressed. Since it is necessary to shift back to a lower gear, the applied drive torque cannot be maintained, which results in the vehicle unacceptably rolling backwards.

DISCLOSURE OF THE INVENTION

Advantages of the Invention

By contrast, the method according to the present invention for starting the movement of a hybrid vehicle having the features of claim 1 has the advantage over the known approaches in that the drive torque of the first drive unit is used as the starting torque for the second drive unit, whereby the latter is driven by the drive torque of the first drive unit, which results in the start of the second drive unit. The now available drive torques of the first and the second drive units are jointly transmitted to the wheels. The joint drive torque is now sufficient to move the vehicle forward without causing the vehicle to roll backwards since an opening of the drive train is eliminated.

The shifting sequence according to the present invention in the twin-clutch transmission allows for the second drive unit to be started while exerting a constant torque on the wheel in that the drive torque provided by the first drive unit is rerouted to the second sub-transmission. When forward propulsion is desired, e.g. when the accelerator pedal is actuated, the vehicle is prevented from rolling backwards, without limiting the functionality of driving with the use of the first drive unit.

In one development of the present invention, the second sub-transmission is shifted to a gear having a transmission ratio that is greater than the transmission ratio of the gear of the first sub-transmission. Together with the drive torques provided by the first and second drive units, the gear having the high transmission ratio allows for a driving function as it is desired by the user of the vehicle, without delay and without unexpectedly rolling backwards.

Advantageously, a clutch is connected upstream from the second sub-transmission, which is set so as to have slippage, a first portion of the maximum drive torque supplied by the first drive unit being transmitted to the wheels, while a second portion of the maximum drive torque is used to start the second drive unit. This structurally simple means makes it possible to start the movement of the hybrid vehicle reliably.

Following the start of the second drive unit, the drive torque of the first and of the second drive unit is transmitted via the clutch and via the second sub-transmission to the wheels. Since a sufficient drive torque is now available, a comfortable drive of the hybrid vehicle is now ensured in any situation, even in extreme situations such as starting the movement on a hill or a curb.

In another development of the present invention, a device for starting the movement of a hybrid vehicle has a first and a second drive unit, the first drive unit being disposed on a first sub-transmission of a twin-clutch transmission comprising two sub-transmissions. In order to avoid rolling backwards when starting the movement of the hybrid vehicle in an attempt to start the movement using the first drive unit, means are provided that start the second drive unit when starting the movement of the hybrid vehicle using the first drive unit, without interrupting the stress applied on the drive train containing the twin-clutch transmission.

By starting the second drive unit, both it and the first drive unit supply a drive torque such that sufficient energy is available for starting the movement of the vehicle.

In a further development of the present invention, the means have a first clutch, which is connected upstream from a first sub-transmission on its side facing away from the wheel, and a second clutch, which is associated with a second sub-transmission on its side facing away from the wheel. Switching the clutches already present in the drive train makes it possible comfortably and simply to reroute the drive torque of the first drive unit to the second sub-transmission, without opening the drive train, which means that a constant drive torque is always applied on the wheels.

In order to be able to transmit the drive torque of the first drive unit to the wheels both via the first sub-transmission as well as via the second sub-transmission, the first drive unit engages in the drive train between the first clutch and the first sub-transmission.

The second drive unit engages in the drive train between the first and the second clutch. When the first clutch is closed, this makes it possible to activate the second drive unit using the drive torque of the first drive unit, which provides its maximum drive power.

Advantageously, the first drive unit is an electric motor and the second drive unit is a combustion engine. This system makes it possible to maintain the functionality of driving electrically. Electrical driving allows both for a user-friendly driving function as well as for saving fuel.

BRIEF DESCRIPTION OF THE DRAWING

The present invention allows for numerous possible embodiments. One of these is to be explained in greater detail with reference to the figures shown in the drawing.

The figures show.

SPECIFIC EMBODIMENTS OF THE INVENTION

Figure 1:
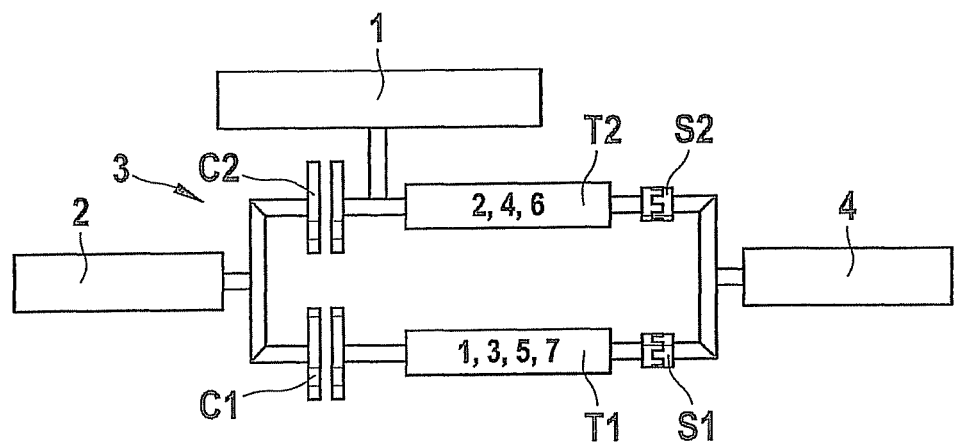
FIG. 1: a basic representation of a torque-split hybrid vehicle having a twin-clutch transmission according to the related art

FIG. 1 shows a known torque-split hybrid vehicle having a twin-clutch transmission. An electric motor 1 and a combustion engine 2 lead to a drive train 3, which connects electric motor 1 and combustion engine 2 to wheels 4.

Drive train 3 has two branches, the first branch comprising a first clutch C1 and the first transmission input shaft T1 of the twin-clutch transmission. Furthermore, first transmission input shaft T1 is followed by a dog clutch S1, which is connected to wheels 4.

The second branch of drive train 3 comprises a second clutch C2, which leads to second transmission input shaft T2 of the twin-clutch transmission. Second transmission input shaft T2 is connected to a second dog clutch 92, which likewise leads to wheels 4.

The uneven gears such as e.g. 1, 3, 5, 7 are located on first transmission input shaft T1, while even gears 2, 4, 6 are disposed on second transmission input shaft T2. If a gear is engaged, the following gear may already be shifted on the inactive shaft. By shifting between the two transmission input shafts T1, T2 with the aid of clutches C1 and C2, the gear is changed quickly.

Combustion engine 2 is situated between the first and the second clutch C1, C2. Electric motor 1 is connected to one of the two transmission input shafts T1, T2. In the present case, the connection is made to second transmission input shaft T2, which bears the even gears. This arrangement makes it possible in certain operating states to operate combustion engine 2 in a different gear, e.g. an uneven gear, than electric motor 1, which is engaged in an even gear. Electric motor 1 is thereby operated in an efficiency-favorable range, which differs from the efficiency-optimized range of combustion engine 2.

The second transmission input shaft T2, to which electric motor 1 is connected, makes it possible to drive purely electrically. When the vehicle is standing, combustion engine 2 can only be started in the neutral position, i.e. without an engaged gear of second transmission input shaft T2 and closed second clutch C2.

If the vehicle is to be driven electrically, a gear is engaged on second transmission input shaft T2 and drive train 3 is stressed. When second dog clutch S2 is closed, the drive torque of electric motor 1 is transmitted to wheels 4. In this state, an attempt to start moving the vehicle electrically may fail, which may happen for example on an uphill gradient with a fully loaded vehicle.

Combustion engine 2 cannot be started since there is not a sufficiently high rotational speed for starting combustion engine 2. In order to engage a lower gear, the second gear must be disengaged. For this purpose, second dog clutch S2 must not transmit a drive torque and must thus be open. This means that drive train 3 must be opened and that the drive torque produced by electric motor 1 cannot be transmitted to wheels 4, which results in the hybrid vehicle rolling backwards.

An exemplary embodiment according to the present invention for a shifting sequence in a twin-clutch transmission of a torque-split hybrid vehicle is now to be explained with the aid of FIGS. 2*a* through 2*e*.

Figure 2A:
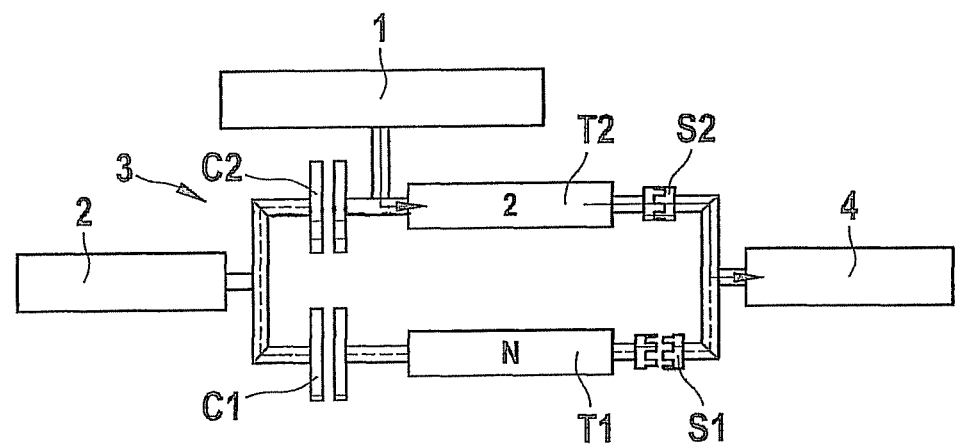
FIG. 2a: an exemplary embodiment of the present invention—initial state

FIG. 2*a* shows the initial state. The hybrid vehicle is driving purely electrically. For this purpose, clutches C1 and C2 are open. The drive torque produced by electric motor 1 is transmitted via second transmission input shaft T2, on which the second gear is engaged, and via closed dog clutch S2 to wheels 4. At this moment, drive train 3 is stressed and a constant drive torque is applied to wheels 4. Nevertheless, the vehicle does not move since the drive torque output by electric motor 1 is insufficient to start the movement of the vehicle. This situation may occur in an attempt to start moving the fully loaded hybrid vehicle on a hill or on a curb.

Figure 2B:
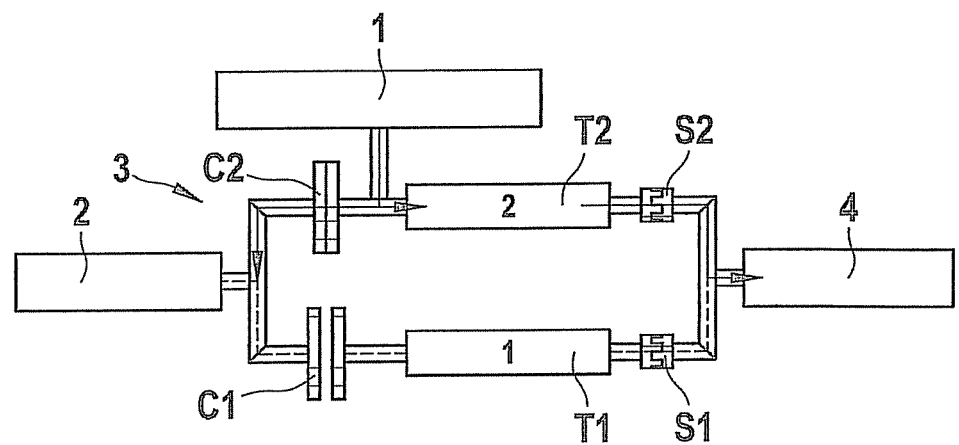
FIG. 2b: an exemplary embodiment of the present invention—closing the clutch and engaging a gear

In order to continue to move the hybrid vehicle nevertheless without rolling backwards, second clutch C2 is closed: As shown in FIG. 2*b*, the drive torque supplied by electric motor 1 is distributed via second transmission input shaft T2 and second dog clutch S2 to wheels 4 and via closed second clutch C2 in the direction of combustion engine 2. Since first transmission input shaft T1 is still inactive, the first gear is engaged and first dog clutch S1 is closed.

Figure 2C:
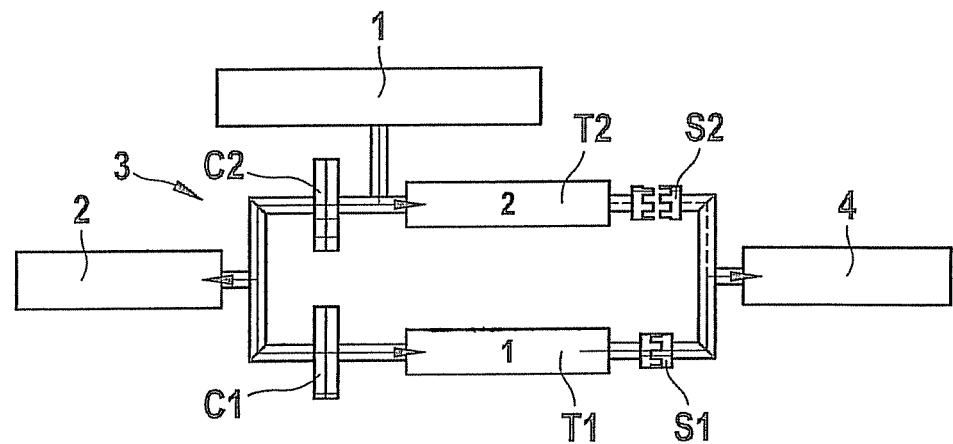
FIG. 2c: an exemplary embodiment of the present invention—closing the clutch with a slip torque

As shown in FIG. 2*c*, subsequently first clutch C1 is closed to such an extent that it sets the drive torque, which is transmitted by electric motor 1, so as to have slippage. As soon as the drive torque of electric motor 1 is transmitted entirely via first clutch C1, dog clutch S2 is torque-free and may be opened. Thus the second gear is engaged and second sub-transmission T2 is shifted to a neutral state. Second transmission input shaft T2 is thus inactive and no longer transmits a drive torque directly to wheels 4. The drive torque is now rerouted to first transmission input shaft 11.

As soon as this has occurred, the maximum drive torque is requested from electric motor 1. First clutch C1 slips and transmits only a portion of the maximum drive torque supplied by electric motor 1. This portion of the drive torque is dimensioned in such a way that the resulting forward propulsion torque on wheels 4 reaches the same value as it already had at the beginning of the process, as it is shown in FIG. 2*a*. This ensures that the vehicle reaction experienced by the driver remains constant during the entire process.

Figure 2D:
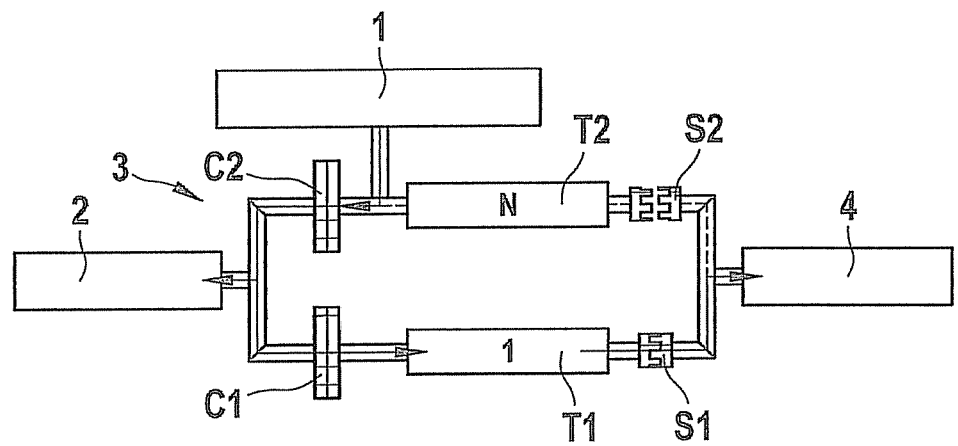
FIG. 2*d*: an exemplary embodiment of the present invention—starting the combustion engine

The remaining portion of the maximum drive torque produced by electric motor 1 acts on combustion engine 2 and drives the latter so as to allow for combustion engine 2 to be started (FIG. 2*d*).

Figure 2E:
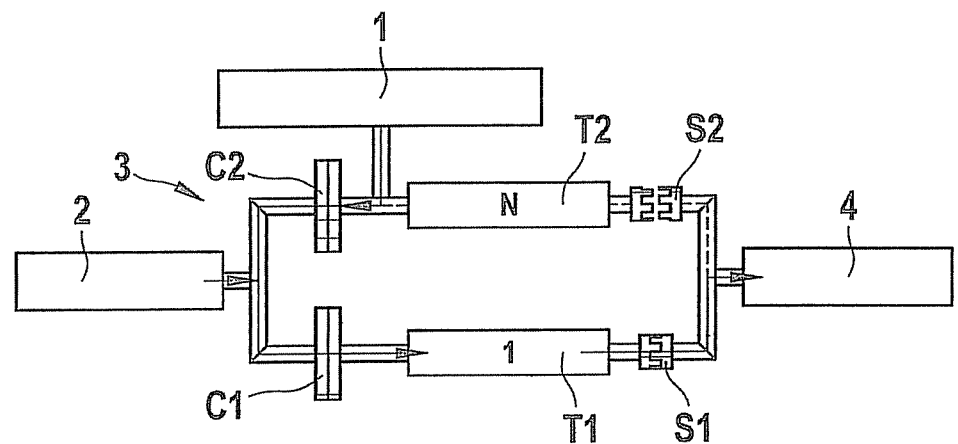
FIG. 2*e*: an exemplary embodiment of the present invention—starting the movement using the electric motor and the combustion engine

FIG. 2*e* shows that first clutch C1 is closed when combustion engine 2 is running. From this moment on, the drive torques supplied by combustion engine 2 and electric motor 1 are jointly transmitted via first transmission input shaft T1, which is switched to first gear, to wheels 4 since the respective dog clutch S1 is closed. The hybrid vehicle will now reliably start moving without rolling backwards, even on the curb or on a hill.

The present invention is also applicable if, in contrast to the described example, electric motor 1 engages on first transmission input shaft T1, which bears the uneven gears.

What is claimed is:

1. A method for starting movement of a hybrid vehicle, which has a first and a second drive unit, the first drive unit being disposed on a first sub-transmission of a twin-clutch transmission having two sub-transmissions, the method comprising:
   applying a drive torque from the first drive unit to the second drive unit;
   starting the second drive unit using the applied torque from the first drive unit when starting the movement of the hybrid vehicle using the first drive unit; and
   jointly transmitting drive torques from the first and the second drive unit to at least one wheel of the vehicle after starting the second drive unit without interrupting stress applied on a drive train comprising the twin-clutch transmission such that the vehicle is prevented from rolling backwards.

2. The method as recited in claim 1, wherein drive torque provided by the first drive unit is rerouted to the second sub-transmission.

3. The method as recited in claim 2, wherein the twin-clutch transmission includes a second sub-transmission, and wherein the second sub-transmission of the twin-clutch transmission is shifted to a gear that has a greater transmission ratio than a transmission ratio of a gear of the first sub-transmission.

4. The method as recited in claim 3, wherein a clutch is connected upstream from the second sub-transmission, which is set so as to have slippage, a first portion of a maximum drive torque supplied by the first drive unit being transmitted to wheels of the hybrid vehicle, and a second portion of the maximum drive torque is used to start the second drive unit.

5. The method as recited in claim 4, wherein following the start of the second drive unit, drive torque of the first and of the second drive unit is transmitted via the clutch and via the second sub-transmission to the wheels.

6. A device for starting movement of a hybrid vehicle, which has a first and a second drive unit, the first drive unit being disposed on a first sub-transmission of a twin-clutch transmission having two sub-transmissions, the device comprising:

an arrangement adapted to:
apply a drive torque from the first drive unit to the second drive unit,
start the second drive unit using the applied torque from the first drive unit when starting up the movement the hybrid vehicle using the first drive unit, and
jointly transmit drive torques from the first and the second drive unit to at least one wheel of the vehicle after starting the second drive unit without interrupting the stress applied on a drive train comprising the twin-clutch transmission such that the vehicle is prevented from rolling backwards.

7. The device as recited in claim 6, wherein the arrangement includes a first clutch which is connected upstream from a first sub-transmission on its side facing away from a wheel, and a second clutch, which is associated with a second sub-transmission on its side facing away from the wheel.

8. The device as recited in claim 7, wherein the first drive unit is adapted to engage in the drive train between the first clutch and the first sub-transmission.

9. The device as recited in claim 7, wherein the second drive unit is adapted to engage in the drive train between the first clutch and the second clutch.

10. The device as recited in claim 6, wherein the first drive unit is an electric motor and the second drive unit is a combustion engine.

* * * * *